Aug. 8, 1967
W. J. KUDLATY
3,334,754
FILTER HEAD STRUCTURE
Filed Nov. 23, 1964
2 Sheets-Sheet 1
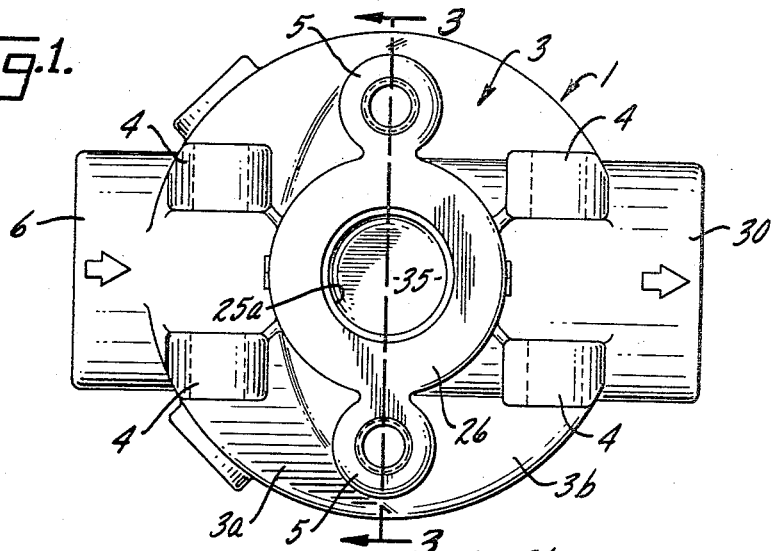
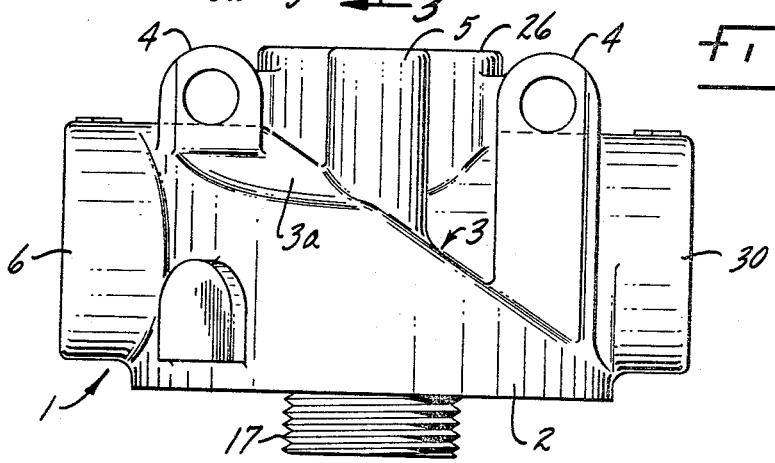
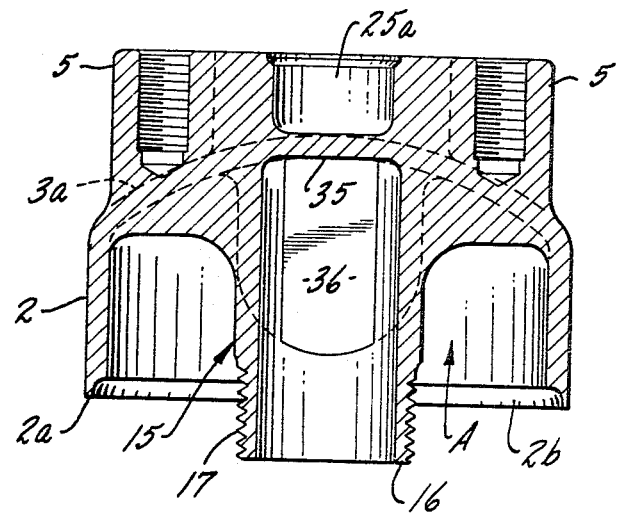
INVENTOR.
Walter J. Kudlaty,
BY Parker & Carter
Attorneys.

Aug. 8, 1967 W. J. KUDLATY 3,334,754
FILTER HEAD STRUCTURE
Filed Nov. 23, 1964 2 Sheets-Sheet 2
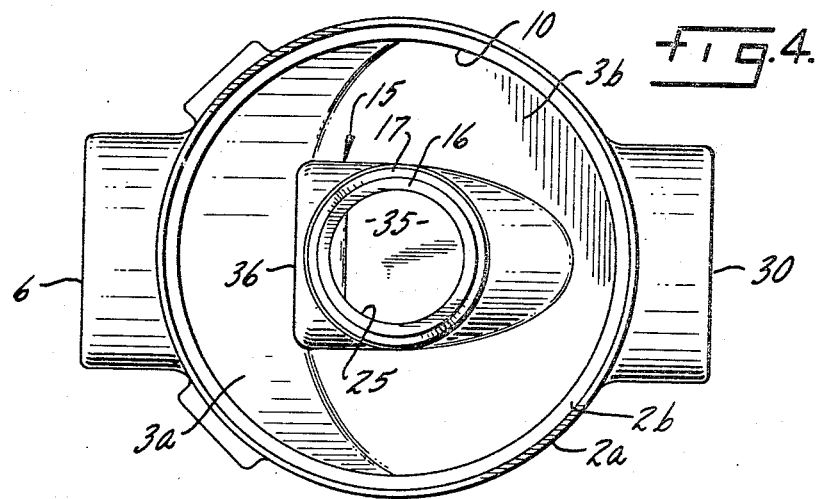
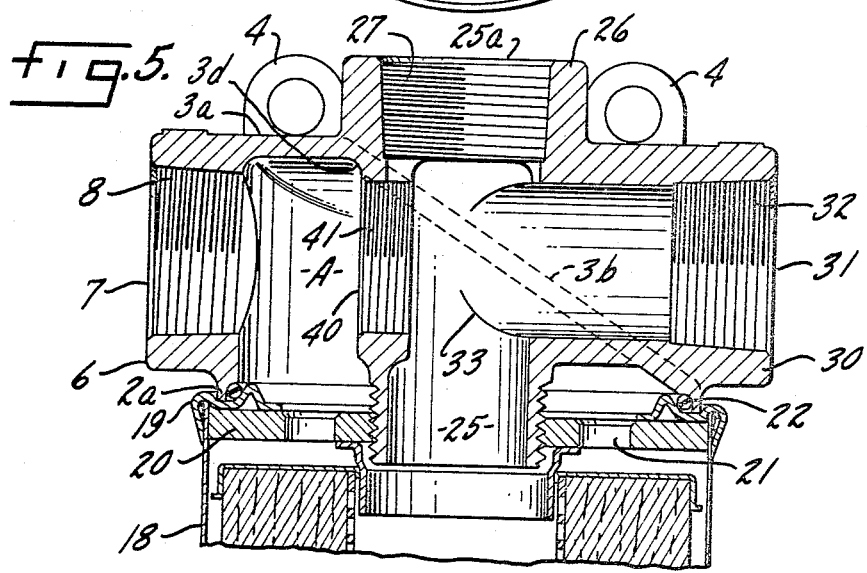
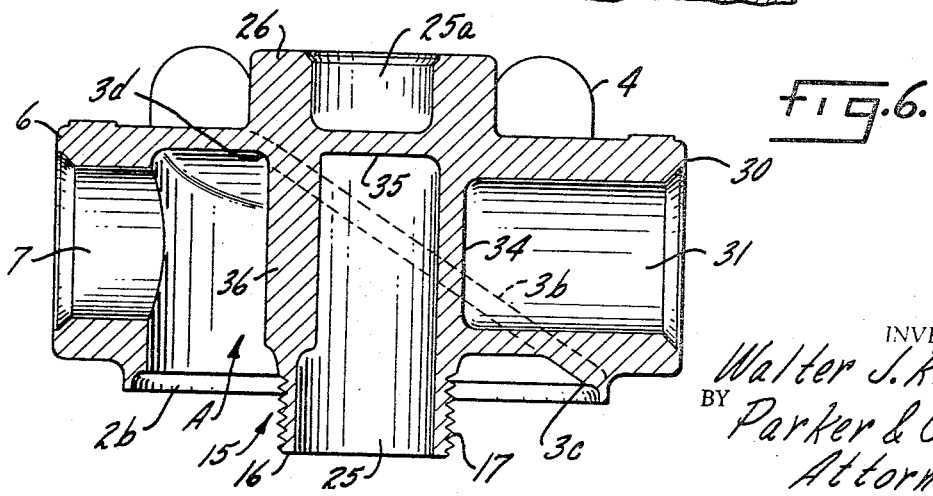
INVENTOR.
Walter J. Kudlaty,
BY Parker & Carter
Attorneys.

United States Patent Office 3,334,754
Patented Aug. 8, 1967

3,334,754
FILTER HEAD STRUCTURE
Walter J. Kudlaty, Elmhurst, Ill., assignor to Marvel Engineering Company, Chicago, Ill., a corporation of Illinois
Filed Nov. 23, 1964, Ser. No. 413,072
7 Claims. (Cl. 210—444)

This invention relates to filters and particularly to head structures attachable to filter bodies.

The provision of a separate head containing inlet and outlet passages for attachment to filter bodies including a housing and a filter element provides for permanent connections of said passages to the piping of the system with which the filter is associated and facilitates the removal of the filter element for cleaning and replacement without disturbing said connections. Fluid is delivered into the filter housing on one side of a filter element, flows through said filter element, depositing contaminants thereon, and thence the filtered fluid flows outwardly of the filter element. In thus moving from an inlet to an outlet passage through the entire filter structure a pressure drop is experienced in the fluid system. It is one purpose of the invention to provide a filter head structure for attachment to a filter body, which head structure is effective to minimize said pressure drop.

Another purpose is to provide a filter assembly having a filter body and a separable head structure therefor.

Another purpose is to provide a filter body head structure having inlet and outlet passages formed therein.

Another purpose is to provide a filter body having a portion effective to serve the dual functions of defining an outlet passage and securing said head structure to a filter body.

Another purpose is to provide a separate filter body head structure having alternate outlet passages.

Another purpose is to provide a separate filter body head structure and by-pass valve assembly.

Another purpose is to provide a filter head structure blank which may be variously machined for a variety of installations.

Another purpose is to provide a filter head structure having alternate outlet selection.

Another purpose is to provide a filter body head structure having an inlet communicating with a chamber in said head, said chamber having an annular outlet for communication with a filter body and an inclined, circular roof descending in a direction away from said inlet.

Other purposes will appear from time to time during the course of the specification and claims.

The invention is illustrated more or less diagrammatically in the accompanying drawings, wherein:

FIGURE 1 is a top plan view;
FIGURE 2 is a side elevation;
FIGURE 3 is a cross-sectional view on the line 3—3 of FIGURE 1;
FIGURE 4 is a bottom plan view;
FIGURE 5 is an axial cross-sectional view of a head in use; and
FIGURE 6 is a cross-sectional view of a head at one step in its manufacture.

Like parts are indicated by like numerals throughout the specification and drawings.

Referring now to the drawings and particularly to FIGURES 1 and 2, the numeral 1 designates generally a head block. The block 1 has a circumferential wall portion 2 and a top wall 3, as the parts are shown. The top wall 3 has an arcuate portion 3a and an inclined portion 3b. Upstanding on wall 3 is a plurality of attaching formations, a number of horizontally disposed, as the parts are shown, formations being indicated at 4, formations 5 being disposed perpendicularly thereto, or vertically as the parts are shown.

Extending laterally from block 1 adjacent wall portion 3a is an inlet fitting portion 6 defining an inlet passage 7 as shown in FIGURE 5. The inner wall surface of fitting portion 6 is conveniently threaded as indicated at 8 for connection with a fluid conduit or pipe of the upstream portion of a fluid system with which the filter is to be associated. The passage 7 communicates with the largest area, beneath wall portion 3a, of a chamber A formed within block 1 and defined by the inner surfaces of wall portions 2, 3a and 3b.

As may be best seen in FIGURES 4 and 5, the circumferential wall 2 has an outer edge 2a lying in a single plane and defining an open end for chamber A as indicated at 10. The canted or inclined roof 3b of block 1 has its lowest point spaced slightly above the edge 2a at a point diametrically opposed from, and in alignment with a center line drawn through inlet passage 7 as indicated at 3c. From the point 3c, the roof undersurface defining a part of the upper wall of chamber A extends in spaced, upwardly inclined segments to its uppermost point coterminous with the undersurface of wall portion 3a as indicated at 3d.

The roof segment 3b thus curves about a central, axial, tubular structure of block 1 which is indicated generally at 15 in FIGURES 3 and 4. The structure 15 has a lowermost fitting end portion 16, as the parts are shown, which extends beneath the edge 2a of wall 2 and which may conveniently carry the external threads 17. As shown in FIG. 5, a filter body having a circumferential wall 18 may have its upper edge 19 held against edge 2a through the mediacy of a plate 20, itself apertured as at 21 for passage of fluid from chamber A into body 18, the plate 20 being threaded onto fitting 16. A seal 22 is provided for sealing engagement with edges 19 and 2a, either or both of which may be grooved or recessed to receive seal 22 (a suitable recess being illustrated at 2b in FIGURE 6, for example). Elements 18-22 as shown are representative only since it will be obvious that body 18 could be secured to block 1 in a variety of manners without departing from the nature and scope of the inventive concepts herein disclosed. The arrangement shown, however, has the advantage of dispensing with the need for mating flanges and fasteners therebetween which might otherwise be required to secure body 18 to block 1.

It will be understood that fluid flowing into body 18 through openings 21 meets one side of a filter surface in body 18. The opposite side of such filter surface communicates with a passage 25 extending through tubular structure 16. A sleeve 26 is upstanding from upper wall 3 of block 1 and is substantially coaxial with passage 25 and structure 16. The inner surface of sleeve 26 is conveniently threaded as at 27 and the area within sleeve 26 constitutes a continuation of passage 25 to form an outlet passage 25a.

An outlet fitting portion 30 extends oppositely from and in axial alignment with inlet fitting portion 6, an alternate outlet passage 31 being defined by fitting portion 30 and having its wall conveniently threaded as at 32. The inner end of passage 31 communicates with passage 25 as indicated at 33.

It will be understood that a suitable plug (not shown) is employed in one of the passages 25a, 31 when the other of said passages 25a, 31 is selective installation in varying piping systems. Alternatively, in forming the device of the invention the tubular wall 16 may simply be continued across the inner end of passage 31 and wall portion 3a may, in effect, be continued across the point of communication between passages 25 and 25a, as indicated at 34 and 35, respectively, in FIGURE 6. With the structure of the invention thus formed, one or the other of said continuing wall portions may be removed, access being had through either passage 25a or 31, prior to installation.

Similarly, an aperture 40 may be formed in the tubular wall 16 in axial alignment with passages 7 and 31 and threaded as indicated at 41. The aperture 40 may have a diameter equal to that of passages 7 and 31, access being had to wall 16 through either of said passages for forming aperture 40. With aperture 40 formed and positioned as shown and with passage 31 communicating with passage 25 as shown, a by-pass valve assembly (not shown) may be inserted through passage 7 or 31 and threadably carried in aperture 40 and may have portions thereof extending into passage 31. Should the filter element in body 18 become contaminated or plugged beyond a predetermined level, a valve (not shown) in such by-pass assembly will open to deliver fluid directly from chamber A into passage 25 for discharge through either of the selected outlets 25a or 31. For those installations not requiring or desiring a by-pass action, the tubular wall 16 simply remains unbroken from roof portion 3a to threads 17, as indicated at 36 in FIGURE 6. It will be noted that wall 16 is initially formed with a somewhat thickened portion spacedly opposed to passage 7 to provide for adequate securement of a by-pass valve assembly when desired. Should the user desire to cease use of a by-pass assembly with a filter head formed as shown in FIGURE 5, it is only necessary to remove said assembly and substitute a suitably formed and threaded plug in aperture 40.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. For example, while the parts are shown with the head uppermost, it will be realized that the structure of the invention may be employed in virtually any desired position without departing from the nature and scope of the invention.

The use and operation of the invention are as follows:

The invention provides a virtually universally employable filter assembly. Contained in the head of the invention are an inlet, alternately selectable outlets and means for selectively associating a by-pass assembly entirely within and with the head. The filter body and element attachable to the head remains unaffected by the selections made with respect to the head and may be easily and simply removed for cleaning and replacement without the necessity of disconnecting conduits or piping from the inlet fitting 6 and outlet fitting 26 or 30. Substantial labor costs and time are thus saved by the avoidance of the need for disconnecting and reconnecting the fluid-tight connections required at points 6 and 26 or 30.

The provision of alternate mounting posts 4 and 5, along with alternate outlet fittings 26 and 30, enable the installation of the inventive assembly in a variety of established piping systems, machine assemblies and the like, and greatly diminishes or eliminates the need for revision or redesign of such systems or machine assemblies.

The filter head structure of the invention provides an inlet chamber having an annular outlet. A circular side wall forming the chamber has a highest portion and a remaining curved portion declining rapidly and sharply in height to a portion diametrically opposed to the center line of said highest portion and of minimum height sufficient only to provide a contact edge for a filter body. The side wall of the head has its end opposite the open end thereof closed by a roof having a flat or perpendicular portion over said highest wall portion. An inlet passage is positioned in said highest wall portion to deliver fluid under pressure to the widest or deepest portion of the chamber formed by the inner surfaces of said side wall and roof.

What is claimed is:

1. A head for use in directing fluid into and out of a filter element, including a hollow substantially cylindrical structure having a closed end and an open end, said open end adapted to be connected to the filter element, a tubular structure defining a tubular passage and located interiorly of said hollow structure, said tubular structure having one end projecting through said open end of said hollow structure and adapted to be connected to said filter element outlet, at least one tubular outlet passage extending through said hollow structure and communicating with said tubular passage, an inlet passage leading into said chamber, said closed end of said hollow structure being inclined to form a roof for said chamber with the chamber having a maximum height on the side adjacent said inlet passage and a minimum height at a location diametrically opposite thereto, with said inlet passage positioned to introduce the fluid at the uppermost portion of said inclined roof, thereby concentrating flow at a point most remote from said inlet and effecting streamline distribution flow of said fluid to said filter element.

2. The structure of claim 1 further characterized in that said tubular structure is coaxial with said hollow structure.

3. The structure of claim 1 further characterized in that said tubular outlet passage extends through the closed end of said hollow structure and is coaxial with said tubular structure.

4. The structure of claim 1 further characterized in that said tubular outlet passage extends radially from said hollow structure.

5. The structure of claim 4 further characterized in that said radially extending tubular outlet passage is axially aligned with said inlet passage and said tubular structure has an opening therein communicating with said chamber, with said opening being aligned with said inlet and said radially extending tubular outlet passage and formed to receive a by-pass check valve.

6. A filter head for attachment to a filter element for use in directing fluid into and out of said filter element, including a hollow substantially cylindrical structure defining a chamber and having a closed end and an open end, said open end being adapted to be connected to the filter element, a tubular structure located in said chamber coaxially with said hollow structure and defining a passage therethrough, said tubular structure having one end projecting through said open end of said hollow structure and adapted to be connected to said filter element outlet, an opposite end of said tubular structure projecting through said closed end of said hollow structure to form an outlet, an alternate tubular outlet structure extending radially into said hollow structure and having a passage connected to the passage of said coaxial tubular structure, an inlet passage aligned radially with and leading into said chamber, said closed end of said hollow structure being inclined to form a roof for said chamber with the chamber having a maximum height on the side adjacent said inlet passage and a minimum height at a location diametrically opposite thereto, with said inlet passage positioned to introduce said fluid at the uppermost portion of said inclined roof thereby concentrating flow at a point most remote from said inlet and effecting streamline distribution flow of said fluid to said filter element.

7. The structure of claim 6 further characterized in that said alternate outlet passage and said inlet passage are axially aligned and said tubular structure has an opening therein aligned with said inlet passage and said alternate passage, thereby connecting said chamber with the coaxial tubular passage, with said opening formed to receive a by-pass check valve.

References Cited

UNITED STATES PATENTS

| | | | |
|---|---|---|---|
| 1,780,774 | 11/1930 | White | 210—444 X |
| 2,413,769 | 1/1947 | Kasten | 210—440 |
| 2,563,548 | 8/1951 | Plante | 210—444 |
| 2,753,047 | 7/1956 | Kettlewell | 210—440 X |
| 2,801,751 | 8/1957 | Thomas | 210—444 X |
| 2,979,208 | 4/1961 | Humbert | 210—444 X |
| 3,237,770 | 3/1966 | Humbert | 210—440 X |

REUBEN FRIEDMAN, *Primary Examiner.*

F. MEDLEY, *Assistant Examiner.*